(12) United States Patent
Lyle et al.

(10) Patent No.: US 9,110,938 B2
(45) Date of Patent: Aug. 18, 2015

(54) PARALLELIZING I/O PROCESSING OF INDEX INSERTIONS DURING INSERTION OF DATA INTO A DATABASE

(75) Inventors: Robert W. Lyle, Morgan Hill, CA (US); Ping Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 12/906,456

(22) Filed: Oct. 18, 2010

(65) Prior Publication Data
US 2012/0096039 A1    Apr. 19, 2012

(51) Int. Cl.
G06F 17/30    (2006.01)
(52) U.S. Cl.
CPC .... G06F 17/30336 (2013.01); G06F 17/30345 (2013.01)
(58) Field of Classification Search
CPC ............... G06F 17/30377; G06F 17/30289; G06F 17/30575; G06F 17/30362; G06F 17/30595; G06F 17/30368; G06F 17/30386; G06F 17/30336; G06F 17/30345
USPC ........................................................ 707/792
See application file for complete search history.

(56) References Cited

U.S. PATENT DOCUMENTS

| 5,551,027 A | 8/1996 | Choy et al. |
| 5,956,704 A * | 9/1999 | Gautam et al. ........................ 1/1 |
| 5,960,194 A | 9/1999 | Choy et al. |
| 6,470,330 B1 * | 10/2002 | Das et al. ....................... 707/718 |
| 8,224,812 B2 * | 7/2012 | Kitsuregawa et al. ........ 707/718 |
| 2002/0040376 A1 * | 4/2002 | Yamanaka et al. ............ 707/530 |
| 2003/0212660 A1 * | 11/2003 | Kerwin ............................. 707/1 |
| 2008/0222089 A1 | 9/2008 | Stewart et al. |
| 2008/0222104 A1 | 9/2008 | Stewart et al. |
| 2009/0187917 A1 * | 7/2009 | Jang et al. ...................... 719/313 |
| 2010/0281006 A1 * | 11/2010 | Scholtz ........................ 707/703 |
| 2011/0035359 A1 * | 2/2011 | Bendakovsky et al. ....... 707/640 |

OTHER PUBLICATIONS

Lee et al., "Performance Comparison of Prefetching and Placement Policies using Parallel I/O", 1997, pp. 1-17.*
Dominic-et al.; "The Persistent Buffer Tree: An I/O-efficient Index for Temporal Date"; Google; 2000.
Brezany, P.; "Parallelization of Input/Output Intensive Applications for Distributed Memory Multiprocessors"; Google; 1997.
IBM-; "Typical Performance Bottlenecks and Tuning Observations"; Google; Nov. 2008.

* cited by examiner

Primary Examiner — Etienne Leroux
Assistant Examiner — Jared Bibbee
(74) Attorney, Agent, or Firm — Mohammed Kashef; SVL IPLaw (57) ABSTRACT

Database elements are inserted into a database object by processing each of a plurality of operations in a sequential order within a first processing round to insert the database elements into the database objects, where processing for at least one operation in the order becomes suspended due to a resource request, and where at least one successive operation is initiated in response to suspension of one or more prior operations to enable prefetching of information for processing the operations. Each suspended operation is re-processed with the prefetched information in one or more additional processing rounds until processing of the operations is completed.

13 Claims, 3 Drawing Sheets

PARALLELIZING I/O PROCESSING OF INDEX INSERTIONS DURING INSERTION OF DATA INTO A DATABASE

BACKGROUND

1. Technical Field

The present invention relates to insertion of data into a database, such as SQL (structured query language) insertions in relational database management systems including multiple indexes.

2. Discussion of the Related Art

Data storage and maintenance operations within a database are particularly important for a variety of applications in which the need for relatively easy and quick access to large amounts of information is required. Structured Query Language (SQL) is a commonly used database computer language used for managing data in database systems such as relational database management systems (RDMS). Database systems such as RDMS utilize a database model in which data is stored in one or more tables with one or more indexes to access data in the table(s). Depending upon the amount of data in the database, multiple indexes can be useful to provide rapid random look ups and also efficient access and ordering of records. The indexes of a database are typically formatted as an index tree with nodes, including an initial root node, intermediate nodes and terminal nodes (also referred to as leaf pages).

Data records can be added to the table(s) of the database by performing an SQL INSERT function. When an SQL INSERT statement is executed to insert a data record into a database table, corresponding insert operations need to be performed on all the indexes defined on the same table. Typically, such insert operations are performed in a sequential manner. Thus, each insert operation of a record into an index has to be finished before the insert operation into the next index can be initiated. In scenarios in which the number of indexes defined on a table is large and the index pages needed for performing insert operations are not within a buffer pool, the processor performing the operations must wait for index page input/output (I/O) operations to finish for all indexes before the record insertion step can be completed. Therefore, the SQL INSERT operation for inserting a record into the database can encounter high response time due to the sequential wait times associated with processing each index page I/O operation.

One method for avoiding high wait times associated with the index page I/O operations involves performing parallel insertions on the indexes, which utilizes a separate processing task per index. While this method can effectively reduce the I/O wait times for accessing index pages, there is the potentially undesirable consequence of utilizing a large or excessive amount of central processing unit (CPU) capacity due to the multiple processing tasks being performed in parallel for the insertions and coordinating their completion.

BRIEF SUMMARY

Accordingly, embodiments of the present invention include a method, a computer program product and a system for processing operations to insert database elements into a database object, in which the processing operations comprise processing each of a plurality of operations in a sequential order within a first processing round to insert the database elements into the database objects, where processing for at least one operation in the order becomes suspended due to a resource request, and where at least one successive operation is initiated in response to suspension of one or more prior operations to enable prefetching of information for processing the operations. The processing operations further comprise re-processing with the prefetched information each suspended operation in one or more additional processing rounds until completion of processing for each of the operations.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

In accordance with embodiments of the present invention, a method, system and computer program product provides efficient parallel processing or parallelizing of index page input/output (I/O) operations during insertion of a database record within a database. The present invention facilitates the insertion of information relating to a data record into two or more indexes defined within a database table in parallel so as to minimize I/O wait time while performing the parallelizing as a single processing task. Providing a single process task to perform the insertion of such information within the table indexes results in minimal or no increase in central processing unit (CPU) capacity. Instead, the example embodiments of the present invention can facilitate a decrease in CPU capacity during the insertion of database records within a database because of reduced suspend operations that might otherwise occur during such insert operations.

In an example embodiment in accordance with the present invention, performance of a Structured Query Language (SQL) INSERT command operation to insert one or more records within a table of a database is enhanced by facilitating a procedure in which the I/O operations to provide each index of the table with appropriate information relating to each inserted record can be parallelized so as to reduce I/O wait time.

The database includes one or more tables to store the records, where each row of a table includes a record and the columns include fields of data for a particular record. A plurality of indexes are defined with the one or more tables to provide quick and easy look up and access to a record stored in a table or insertion/deletion of a record within the table by identifying the record location in the index tree with a key value and a RID (row identification) value unique to the particular index. These values are located at the terminal nodes, also referred to as leaf pages, of the index tree. For example, a particular record stored within a table of a database can be easily accessed and retrieved utilizing one or more indexes of the database, in which an index tree can be navigated to a specific leaf page utilizing the RID and key values to navigate through the index tree to the specific location of the record to be accessed within the table.

When an SQL INSERT statement is executed to insert a record into a table, corresponding insert operations need to be performed on all the indexes defined on the same table. This is typically performed in a sequential manner, where a processor, such as a database search engine, populates a buffer pool with the nodes for each index, including intermediate nodes or non-leaf pages and also the leaf pages for each index. When there are a large number of index pages for a table, the index pages needed to complete insertion of the record in the table may not be in the buffer pool. The processor must wait for an index page I/O operation to be complete for insertion of information before proceeding to insertion of information within the next index page. The I/O wait times for retrieval of each subsequent index page can add up and result in higher response times to achieve an SQL INSERT operation, particularly when there are a large number (for example, hundreds of thousands or millions) of records to be inserted within a table.

In the example embodiment of the present invention, a determination is made whether to sequentially wait for the leaf page of each index to be within the buffer pool for a particular record to be inserted within the database. If the determination is to not wait, a prefetch request is issued by the database search engine for retrieval of the index leaf page into the buffer pool while also proceeding forward to retrieve the next index leaf page corresponding with the inserted record.

Figure 1A:
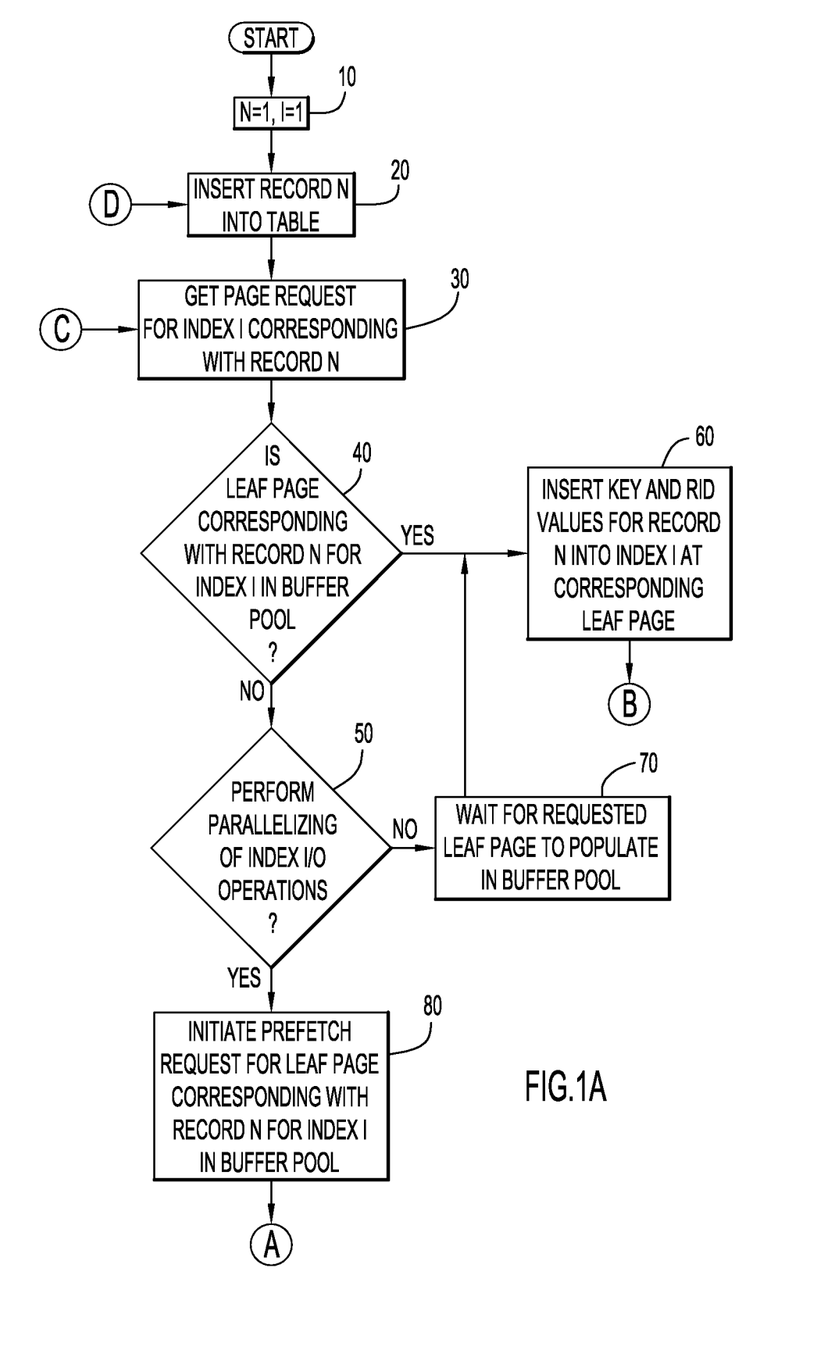
FIGS. 1A and 1B provide a flowchart depicting an example method of performing an SQL INSERT function with parallelizing of I/O index page operations for insertion of a record into a database according to an embodiment of the present invention.
Figure 1B:
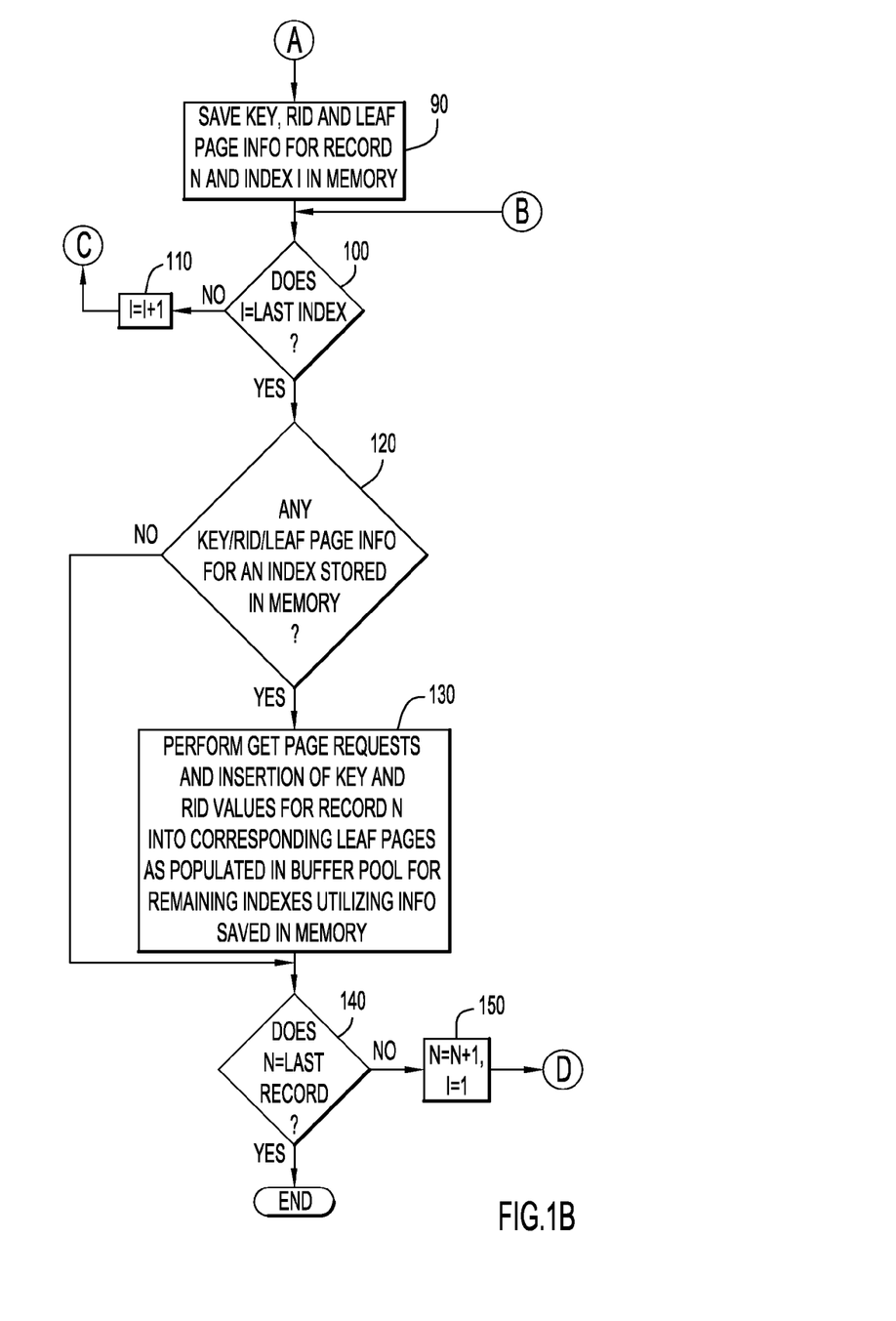

An example method is depicted in the flowchart of FIGS. 1A and 1B, where the method facilitates parallelizing, when desired, of I/O index page operations during an SQL INSERT statement in which multiple records are inserted within a database table including multiple indexes. In this example embodiment, there are N records to be inserted within a database table having I indexes, where N and I can be any selected number. The method can be particularly useful in minimizing I/O wait times in scenarios in which the number N of records for insertion and/or the number of indexes defined for a table is very large. For example, the number of records N can be on the order from $10^2$ to $10^6$ or even greater. The number of indexes I is smaller, typically 10 or less, but can also be as much as 10-20 or even greater.

In a first step of the SQL INSERT operation (step 10), the record N and index I are set at 1 to designate the first record to be insert and the first index of the table to be processed in the operation. Record N is inserted as a row within the table (step 20), and a get page request is performed (step 30) to retrieve the leaf page of index I from a buffer pool that is designated to store index pages. A determination is made (step 40) regarding whether the leaf page for index I and corresponding with record N is in the buffer pool. The buffer pool may already store a portion of certain indexes including index I, such as non-leaf pages. It is not likely, at least in the first pass of the SQL INSERT operation in which the first record is being inserted, that the leaf page for index I is within the buffer pool. However, in the event this leaf page is within the buffer pool, the key and RID values corresponding with record N are inserted into index I at this leaf page (step 60), and the process then skips to step 100.

When a determination is made that the leaf page needed for index I is not within the buffer pool, a decision is made (step 50) regarding whether to perform parallelizing of index I/O operations. An analysis (as described in further detail below) can be performed to determine whether it would be beneficial to perform parallelizing, such that the parallelizing operation (steps 80 and 90 of FIGS. 1A and 1B) is selectively performed. In the event the determination is to not perform parallelizing of index I/O operations, the database search engine waits for the index I to further populate until the requested leaf page is accessible within the buffer pool (step 70), and the key and RID values corresponding with record N are then inserted at this leaf page of index I (step 60). The process then proceeds to step 100.

In the event a determination is made to perform parallelizing of index I/O operations, a request is performed to prefetch within the buffer pool the leaf page corresponding with record N for index I (step 80). Referring to FIG. 1B, the database engine saves key and RID information corresponding with record N and for index I in a memory structure (e.g., a temporary storage location assigned within a memory structure of the database) (step 90). The database engine also stores information regarding the leaf page number for this record N and for index I, so that it is easy to revisit the leaf page for insertion of the key and RID values (instead of having to re-traverse the index tree) when the leaf page becomes available for insertion.

A determination is made whether the last index of the table has been processed (step 100). In the event unprocessed indexes still remain, the next index is processed for the same record N utilizing the same processing steps 30-100. In the flowchart steps shown in FIG. 1B, the value of I is increased to the next index (step 110) and the process is repeated starting with a get page request for the next index I corresponding with record N (step 30).

When the last index has been processed for record N, a determination is made (step 120) regarding whether a prefetch for any table index was required and thus resulted in key, RID and leaf page information having been stored in the memory structure. In the event no prefetch requests were performed for any table index in relation to record N, the process proceeds to step 140.

In the event a prefetch request was performed for any table index in relation to record N, the database search engine continues another round of performing get leaf page requests in a sequential order for the remaining indexes that have not yet had insertions (step 130). The saved key, RID and leaf page information provide the insert position for each index so that the location within each index tree can be navigated to insert the key and RID values when the leaf page for each index has been populated within the buffer pool. At this point in the process, the current record N has been inserted into the database table and all table indexes have been updated with corresponding key and RID values to facilitate navigational access to this inserted record via the indexes.

A determination is made (step 140) whether the last record has been inserted. In the event the last record has been inserted into the database table, the SQL INSERT process is complete. In the event one or more further records are to be inserted, the process of inserting the next record N and performing index insertions associated with the next record N is repeated. In particular, as shown in FIG. 1B (step 150), the value of N is increased by 1 to designate the next record, while the value of I is set back to 1 such that insertion of key and RID values for the next record N is initiated with the first index, and the process is then repeated beginning with step 20.

In the method described above, the first round of get index page requests for a particular record N can be made conditional (steps 30, 50 and 80) so as to initiate I/O parallelizing of the index insertions. The second round of get index page requests (step 130) for the remaining indexes in which a prefetch request was required in the first round is unconditional, since the database search engine waits until the leaf page for a particular index is populated within the buffer pool for index insertion prior to proceeding to the next index requiring insertion. However, the method can be optionally modified to provide the I/O parallelizing of index insertions as an iterative process, in which the get page request for indexes remains conditional in the second round and any selected number of subsequent rounds. In other words, a repeat of steps 40, 50 and 80 as shown in FIG. 1A can occur any selected number of times for index pages not within the buffer pool, where indexes with key and RID information stored within the memory structure are repeatedly revisited as necessary until their index pages are populated within the buffer pool.

A simple, non-limiting example is now described in which records are to be added to a table including three indexes I1, I2 and I3 utilizing the method described above and depicted in the flowchart of FIGS. 1A and 1B. After a row of data corresponding with record N1 is inserted into this table, all indexes I1, I2 and I3 need to be inserted with the corresponding index key value and RID value. Without using the parallel I/O operation for insertion into the indexes, if an index page needed for insert is not in the buffer pool, the database engine would need to wait until that index page is brought into the buffer pool and then complete the insert before an insertion would be performed into the next index. Thus, all of the I/O waits for the indexes I1, I2 and I3 would be performed sequentially, increasing the overall elapsed time for processing the SQL INSERT operation for record N1 and potentially subsequent records.

When the parallel insert operation is activated (i.e., step 50 in FIG. 1A), parallelizing of the index I/O operations can occur such that a subsequent index (for example, index I2) can be processed for insertion while a prefetch request is being simultaneously processed for a previous index (for example, index I1). In the above example, at least some of the non-leaf pages for one or more of the indexes I1, I2 and I3 may already be in the buffer pool. In the get page request for the first index IL the key and RID information is used to traverse the index tree for index I1 to locate the leaf page for insertion. The get page request for such leaf page number is conditional. Thus, in the event this leaf page is not in the buffer pool, instead of waiting for this page to be brought into the buffer pool synchronously, the database search engine issues a prefetch request to bring in this leaf page into buffer pool asynchronously (step 80). The database engine then saves the key and RID information along with the leaf page number providing the insert position for index I1 into a memory structure (e.g., a temporary storage location of the database).

The database engine then proceeds to the next index I2 and performs the same series of process steps. Thus, in the event the leaf page for insertion in index I2 is not in the buffer pool, the same prefetch request will be made for this leaf page and the database engine saves the key, RID and leaf page number providing the index insert position information into the memory structure before proceeding to the next index I3. In the event the leaf page required for index I3 is already in buffer pool, the insertion of the key and RID values for index I3 can be finished with no I/O wait time. After all indexes have been processed for a first time to either to perform an insertion or to prefetch the leaf page needed for insert, the database engine will examine the memory structure and then perform the insert into indexes I1 and I2 which have been skipped in the first round of the process (step 130).

Typically, the I/O time needed for bringing in an index page into the buffer pool is significantly longer than the CPU time needed for inserting into the leaf page. Therefore, when index I1 is revisited in the process by the database search engine, there is a chance that the prefetch request for the leaf page associated with this index is still in progress. The database search engine performs the get page request for this leaf page of index I1 as an unconditional request, waiting until this leaf page is populated within the buffer pool to facilitate completion of insertion into index I1 of the key and RID values prior to moving to the next index I2 that needs to be revisited. For each of the indexes I1 and I2, since the key, RID and leaf page number information have been saved in the memory structure, the database search engine can save time and avoid the cost of regenerating the key and re-traversing the index tree in order to perform the insert.

In the previous example including a table with three indexes I1, I2 and I3, the I/O wait time for index insertion operations does not occur separately (i.e., where the processor waits until the leaf page is available for insertion into index I1 before proceeding to index I2, etc.) but is instead parallelized in the first round. This may result in an I/O wait time reduction by as much as a factor of 2, since the prefetching for leaf pages of indexes I1 and I2 are occurring simultaneously as the insertion occurs for index I3. In another example in which there are five indexes defined for a table where each table insertion encounters four index I/O waits (i.e., only one out of the five indexes has it's corresponding leaf page in the buffer pool while the rest of the indexes require an I/O wait to bring in the leaf pages into the buffer pool for insertion), the I/O wait time might be four times greater than when practicing the example method according to the invention (i.e., four I/O waits for indexes I1-I4 are reduced to one I/O wait since all four I/O prefetch requests occur simultaneously). The degree of the I/O wait time reduction can be significantly enhanced as the number of indexes defined on a table increases and also when the number of records to be inserted within the table increases.

As noted above in the example embodiment (at step 50), the parallelizing can be selectively activated or deactivated (i.e., turned on or off) during a process depending upon a particular scenario. In particular, real time statistical information can be used to control the usage of I/O parallelism for index insertion. For example, if there is only a small number of indexes encountering a buffer miss on the get page request (i.e., no leaf page in the buffer pool for the index I), running with I/O parallelism for index insertion operations may not reduce the elapsed time but instead increase CPU time. Real time statistics can be used to track the history of get page requests for index insertion on the table, with I/O parallelism being activated when a certain number of indexes (e.g., the majority of indexes) encounter a set number of buffer misses (e.g., two or more buffer misses) during index get page requests. The I/O parallelism for index insertion operations can be dynamically enabled or disabled during the process to obtain optimal performance during the SQL INSERT process.

In an example process in which an insert workload includes a large number records, such as 1 million or more records, and a plurality of indexes, there might be a large number (e.g., a majority) of the leaf pages for the indexes that are not in the buffer pool at the start of the workload (e.g., during the insertion of the first few thousand or more of the records into the table). In this scenario, activation of I/O parallelism during index insertion would be beneficial at least for a selected number of records. After a certain period of time during the process (e.g., after insertion of 100,000 or more records), a suitable number of the index leaf pages may already be populated within the buffer pool, such that the I/O wait period may be significantly reduced due to index page population presently within the buffer pool in relation to the initial time period in which records were first inserted within the table and the buffer pool was less populated. Based upon real time statistical information, the I/O parallelism operation can be selectively deactivated during the SQL INSERT process in the event the statistical information provides a determination that the CPU capacity required to conduct the I/O parallelism process becomes disadvantageous in relation to the reduced I/O index insertion wait time that is being presently observed.

An example of real time statistical information that can be used to selectively activate or deactivate the I/O parallelism for index insertion operations is provided as follows. At any given time during the process, the current total number N of records inserted can be compared with a current number Y of record insertions that encountered a selected number (e.g., two or more) of index I/O waits (i.e., the number of indexes that did not have their leaf pages within the buffer pool and thus required a prefetch request). The ratio of Y/X can be determined. In the event the ratio of Y/X is greater than a predetermined threshold value, the I/O parallelism remains activated (or can be selectively activated if the I/O parallelism was inactive). Alternatively, in the event the value of Y/X is not greater than the predetermined threshold value, the I/O parallelism can be selectively deactivated (or remain inactive).

It is noted that the invention is not limited to the above examples for using real time statistical information for activation or deactivation of I/O parallelizing for index insertion operations. Any suitable mechanism for determining whether and to what extent I/O waits are occurring can be utilized to facilitate an automated activation or deactivation of the I/O parallelizing processing steps. Thus, the record insertion process can be "self-monitoring" to activate or turn on the I/O parallelizing of index insertion operations when it is determined that there are too many I/O waits and to deactivate such operations when it is determined that there are few I/O waits. The determination of when to activate/de-activate the I/O parallelizing of index insertion operations can be adjusted or tunable to obtain a suitable trade-off between elapsed time and CPU constraints based upon a particular scenario.

Thus, the selective activation and deactivation of the I/O parallelism for index insertion enhances the efficiency of the record insertion process by reducing I/O wait times while optimizing CPU performance.

In the examples described above, I/O parallelism for index insertion operations occurs for processing of a single record as each record/row is sequentially inserted within a database table. In other words, I/O parallelizing for index insertion operations occurs for a first record being inserted within a database table prior to I/O parallelizing occurring for the next sequential record to be inserted within the database table. However, it is noted that the invention is not limited to such sequential processing of records with I/O parallelizing operations. The present invention is also applicable for parallelizing of index insertion operations across different row insertions in a database table. In other words, a plurality of records can be simultaneously processed or processed in parallel for row insertion within a table, where I/O parallelizing of index insertion operations can occur (as necessary) for each record being processed in parallel. This provides a further benefit in reducing wait times for a large number of records even when a small number of indexes (e.g., a single index or two or three indexes) exist for a database table.

Figure 2:
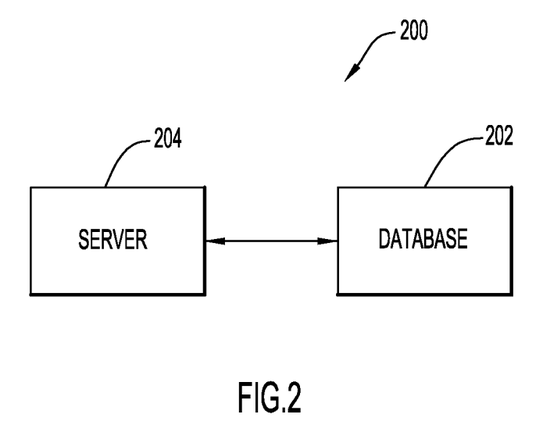
FIG. 2 is a block diagram illustrating an example processor and database for performing an SQL INSERT function with I/O parallel processing of index page insertions in accordance with the present invention.

The methods described above and depicted in the flowchart of FIGS. 1A and 1B can be implemented utilizing any suitable system including hardware and software implemented in a single module or unit or, alternatively, implemented as two or more separate units. An example embodiment of a system for implementing the method is schematically depicted in FIG. 2. In particular, system 200 includes a record database 202 and a server 204 that is operatively coupled to the database 202. The record database 202 and server 204 can be implemented together a single hardware unit or, alternatively, implemented in any two or more hardware units coupled together. The server 204 includes a CPU, a database search engine and one or more memory structures which provide storage locations for the buffer pool and storage of index information associated with prefetch operations. The server facilitates operations including, without limitation, retrieval, insertion and deletion of records within the database. The server 204 can receive records for storage on the database 202 from any one or more suitable sources and/or in any suitable manner including, without limitation, via direct data entry of record information to the server, via cloud computing to receive record information, via network computing in which the server is operatively coupled to one or more other servers to receive record information, via any suitable computer readable storage medium that includes record information (e.g., magnetic, optical, floppy, DVD, CD, other non-transitory medium, etc.), and via any suitable type of carrier wave or signal for downloading from a source via a communication medium (e.g., bulletin board, network, LAN, WAN, Intranet, Internet, etc.).

The server and database can be any suitable computer systems implemented by any type of hardware and/or other processing circuitry. In particular, the server and database may be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Droid, iPhone, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information. In addition, record information may be received by the server and retained by the database in any suitable manner, such as the types described above.

In operation, the server 204 can insert records into the database 202 utilizing the method described above and depicted in the flowchart of FIGS. 1A and 1B. The server 204 receives record information and performs the operation of inserting the records as rows in a table for storage by database 202. The selective I/O parallelizing of index insertion operations is performed as necessary during the record insertion process, based upon statistical information obtained by the server CPU during the process relating to the availability of index pages in the buffer pool and number of prefetch requests required for processed records.

The methods and systems described above are not limited to optimizing record insertion processes by reducing I/O wait times. Other possible applications utilizing example methods and systems of the present invention include, without limitation, processes in which waits occur due to data locks for security or other reasons (e.g., p-locks in a datasharing environment), and any other processes in which waits are required for any resource in which the resource can be requested asynchronously to perform an insertion (e.g., tree lotches, tree latches, controlling disk resources, etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for processing operations to insert database elements into a database object comprising:
   a computer readable storage device having computer readable program code embodied therewith, the computer readable program code configured to:
   process each of a plurality of operations in a sequential order within a first processing round to insert the database elements into the database object, wherein the database object comprises a database table and each database element is inserted within a corresponding row within the database table, and processing for at least one operation in the order becomes suspended due to a resource request associated with the processing of the at least one operation, the resource request including a request to obtain a location for insertion of at least one database element of the database elements into the database object, and wherein at least one successive operation is initiated in response to suspension of one or more prior operations to enable prefetching of information for processing the operations; and
   re-process with the prefetched information each suspended operation in one or more additional processing rounds until completion of processing for each of the operations;
   wherein the computer readable program code is further configured to selectively suspend the at least one operation in the order based upon a comparison of a current number of operations suspended in relation to a number of database elements inserted in the database object.

2. The computer program product of claim 1, wherein the database table includes a plurality of indexes providing access to information in the database table, each index comprises a plurality of leaf pages, each leaf page provides information associated with a location of at least one database element within the database table, the resource request comprises a request for an index leaf page during an operation within the sequential order, and the insertion of database elements into the database object includes insertion of information at index leaf pages corresponding with the database elements.

3. The computer program product of claim 2, wherein the computer readable program code is further configured to process each of a plurality of operations in a sequential order within a first processing round by:
   determining, in a sequential order of the indexes, whether index leaf pages corresponding with each database element are available in a buffer pool;
   in response to any unavailable index leaf page corresponding with a database element not being in the buffer pool, executing a prefetch request into the buffer pool for the unavailable index leaf page while simultaneously determining whether a next index leaf page in the sequential order corresponding with the database element is available in the buffer pool; and
   inserting into the available index leaf pages information associated with corresponding database elements.

4. The computer program product of claim 3, wherein the computer readable program code is further configured to re-process with the prefetched information each suspended operation in one or more additional processing rounds by:
   inserting information associated with remaining database elements having unavailable index leaf pages from the first round into available index leaf pages in response to the unavailable index leaf pages corresponding with the remaining database elements becoming available within the buffer pool.

5. The computer program product of claim 2, wherein the computer readable storage medium is configured to insert the database elements in parallel within rows of the database table, such that the processing each of a plurality of operations in a sequential order within a first processing round and the re-processing with the prefetched information each suspended operation in one or more additional processing rounds are performed in parallel for at least two database elements.

6. The computer program product of claim 2, wherein the processing each of a plurality of operations in a sequential order within a first processing round and the re-processing with the prefetched information each suspended operation in one or more additional processing rounds are performed by the computer readable program code in a sequential order for each index of the database table corresponding with at least one database element such that all index leaf pages corresponding with a single database element are inserted with information associated with the single database element prior to proceeding to processing indexes for another database element.

7. The computer program product of claim 3, wherein the computer readable program code is further configured to:
   subsequent to insertion of information for all index leaf pages corresponding with a set number of database elements, determine for remaining database elements whether to continue prefetching and re-processing with prefetched information for suspended operations; and
   in response to a determination to discontinue prefetching and re-processing with prefetched information for suspended operations, process indexes in a sequential order for each remaining database element such that each leaf page of an index being processed is obtained from the buffer pool and inserted with information corresponding with a remaining database element prior to proceeding to a next index to be processed in the sequential order for the remaining database element.

8. The computer program product of claim 3, wherein suspension of an operation in the order due to a resource request by the computer readable program code occurs when an index leaf page to be inserted with information corresponding with a database element is absent from the buffer pool, and prefetching of information with at least one successive operation being initiated by the computer readable program code comprises prefetching of the absent index leaf page into the buffer pool in parallel with processing the next index in the sequential order.

9. A system for processing operations to insert database elements into a database object, the system comprising:
   a database including a database object configured to store database elements; and
   a processor configured with logic to:
   process each of a plurality of operations in a sequential order within a first processing round to insert the database elements into the database object, wherein the database object comprises a database table and each database element is inserted within a corresponding row within the database table, and processing for at least one operation in the order becomes suspended due to a resource request associated with the processing of the at least one operation, the resource request including a request to obtain a location for insertion of at least one database element of the database elements into the database object, and wherein at least one successive operation is initiated in response to suspension of one or more prior operations to enable prefetching of information for processing the operations; and re-process with the prefetched information each suspended operation in one or more additional processing rounds until completion of processing for each of the operations;

wherein the processor is further configured with logic to selectively suspend the at least one operation in the order based upon a comparison of a current number of operations suspended in relation to a number of database elements inserted in the database object.

10. The system of claim 9, wherein the database table includes a plurality of indexes providing access to information in the database table, each index comprises a plurality of leaf pages, each leaf page provides information associated with a location of at least one database element within the database table, the resource request comprises a request for an index leaf page during an operation within the sequential order, and the insertion of database elements into the database object includes insertion of information at index leaf pages corresponding with the database elements.

11. The system of claim 9, wherein the processor is further configured with logic to process each of a plurality of operations in a sequential order within a first processing round by:

determining, in a sequential order of the indexes, whether index leaf pages corresponding with each database element are available in a buffer pool;

in response to any unavailable index leaf page corresponding with a database element not being in the buffer pool, executing a prefetch request into the buffer pool for the unavailable index leaf page while simultaneously determining whether a next index leaf page in the sequential order corresponding with the database element is available in the buffer pool; and inserting into the available index leaf pages information associated with corresponding database elements.

12. The system of claim 11, wherein suspension by the processor of an operation in the order due to a resource request occurs when an index leaf page to be inserted with information corresponding with a database element is absent from the buffer pool, and prefetching by the processor of information with at least one successive operation being initiated comprises prefetching of the absent index leaf page into the buffer pool in parallel with processing the next index in the sequential order.

13. A computer program product for processing operations to insert database elements into a database object comprising:

a computer readable storage device having computer readable program code embodied therewith, the computer readable program code configured to;

process each of a plurality of index insertion operations in a sequential order within a first processing round to insert the database elements into rows of a database table, the index insertion operations comprising insertion of data associated with records at the leaf pages of indexes, wherein processing for at least one index insertion operation in the order becomes suspended due to a resource request associated with the processing of the at least one index insertion operation, the resource request including a request for a leaf page for an index that is not yet available, and wherein at least one successive operation is initiated in response to suspension of one or more prior operations to enable prefetching of the leaf page within a buffer; and re-process each suspended operation in one or more additional processing rounds and in response to each leaf page associated with each suspended operation becoming available within the buffer until completion of processing for each of the operations;

wherein the computer readable program code is further configured to selectively suspend the at least one operation in the order based upon a comparison of a current number of operations suspended in relation to a number of database elements inserted in the database object.

* * * * *